US007242989B2

(12) United States Patent
Blevins et al.

(10) Patent No.: US 7,242,989 B2
(45) Date of Patent: Jul. 10, 2007

(54) APPARATUS AND METHOD FOR BATCH PROPERTY ESTIMATION

(75) Inventors: Terrence L. Blevins, Round Rock, TX (US); Ashish Mehta, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 689 days.

(21) Appl. No.: 10/449,437

(22) Filed: May 30, 2003

(65) Prior Publication Data

US 2004/0243380 A1 Dec. 2, 2004

(51) Int. Cl.
*G05B 13/02* (2006.01)
*G06F 7/60* (2006.01)
*G06F 17/10* (2006.01)

(52) U.S. Cl. ............................ 700/47; 700/29; 700/31; 700/44; 700/46; 703/2; 706/12; 706/16; 706/28

(58) Field of Classification Search ................. 700/29, 700/30, 31, 44, 45, 46, 47, 48, 52, 265, 266, 700/268, 269–272, 32; 706/12, 15–17, 21, 706/25; 422/3, 105, 109, 110, 129; 703/2
See application file for complete search history.

(56) References Cited

U.S. PATENT DOCUMENTS 3,939,328 A * 2/1976 Davis .......................... 700/41
4,054,780 A 10/1977 Bartley et al. .............. 364/106
4,197,576 A 4/1980 Sanchez ..................... 364/106
4,358,822 A 11/1982 Sanchez ..................... 364/151
5,111,531 A 5/1992 Grayson et al. .............. 395/23
5,166,873 A 11/1992 Takatsu et al. ............. 364/151
5,248,577 A 9/1993 Jerome ........................ 430/30
5,268,835 A 12/1993 Miyagaki et al. ........... 364/151
5,402,333 A 3/1995 Cardner ...................... 364/151
5,442,562 A 8/1995 Hopkins et al. ............ 364/468
5,519,605 A 5/1996 Cawlfield ................... 364/151
5,659,667 A 8/1997 Buescher et al. ............. 395/23
5,673,368 A 9/1997 Broese et al. ................. 395/22
5,680,409 A 10/1997 Qin et al. ..................... 371/48

(Continued)

FOREIGN PATENT DOCUMENTS

GB 2 186 715 A 8/1987

(Continued)

OTHER PUBLICATIONS

Search Report under Section 17(5) issued in GB0411361.9 application by the United Kingdom Patent Office on Sep. 17, 2004.

(Continued)

*Primary Examiner*—Ramesh Patel
(74) *Attorney, Agent, or Firm*—Marshall, Gerstein & Borun LLP

(57) ABSTRACT

A method and apparatus that generates an estimate of a property of a batch process uses a non-parametric model to generate a plurality of rate of reaction estimates associated with the batch process. Each rate of reaction estimate may correspond, for example, to a particular time during the batch process. The plurality of rate of reaction estimates are then integrated to generate an estimate of a property of the batch at the particular time.

53 Claims, 10 Drawing Sheets

200
204
INITIAL CONDITIONS
MEASURED CONDITIONS
ELAPSED TIME
NEURAL NETWORK
EST. RATE OF REACTION
208
INTEGRATOR
START OF BATCH INDICATOR
ESTIMATED CURRENT PROPERTY
212
LATCH
ESTIMATED ENDING PROPERTY
END OF BATCH INDICATOR

U.S. PATENT DOCUMENTS

| | | | | |
|---|---|---|---|---|
| 5,682,317 | A | 10/1997 | Keeler et al. | 364/431 |
| 5,687,077 | A | 11/1997 | Gough, Jr. | 364/149 |
| 5,727,128 | A | 3/1998 | Morrison | 395/10 |
| 5,740,033 | A * | 4/1998 | Wassick et al. | 700/29 |
| 5,752,007 | A | 5/1998 | Morrison | 395/500 |
| 5,822,220 | A | 10/1998 | Baines | 364/528 |
| 5,842,189 | A | 11/1998 | Keeler et al. | 706/16 |
| 5,877,954 | A | 3/1999 | Klimasauskas et al. | 364/149 |
| 5,933,352 | A | 8/1999 | Salut | 364/474.16 |
| 6,056,781 | A | 5/2000 | Wassick et al. | 703/12 |
| 6,088,630 | A | 7/2000 | Cawlfield | 700/266 |
| 6,106,785 | A * | 8/2000 | Havlena et al. | 422/109 |
| 6,122,557 | A | 9/2000 | Harrell et al. | 700/45 |
| 6,311,093 | B1 | 10/2001 | Brown | 700/95 |
| 6,311,095 | B1 | 10/2001 | Brown | 700/177 |
| 6,408,227 | B1 | 6/2002 | Singhvi et al. | 700/266 |
| 6,440,374 | B1 * | 8/2002 | Jelinek et al. | 422/109 |
| 6,484,133 | B1 | 11/2002 | Vogt | 702/190 |
| 6,490,501 | B1 | 12/2002 | Saunders | 700/198 |
| 6,760,716 | B1 | 7/2004 | Ganesamoorthi et al. | |
| 2001/0018643 | A1 | 8/2001 | Brown | 703/6 |
| 2001/0027385 | A1 | 10/2001 | Brown | 703/9 |
| 2001/0044710 | A1 | 11/2001 | Brown | 703/6 |
| 2002/0035457 | A1 | 3/2002 | Brown | 703/6 |
| 2002/0188582 | A1 | 12/2002 | Jannarone et al. | 706/26 |
| 2003/0219797 | A1 | 11/2003 | Zhao et al. | |

FOREIGN PATENT DOCUMENTS

| | | | |
|---|---|---|---|
| GB | 2402232 | A * | 12/2004 |
| JP | 2005004742 | A * | 1/2005 |

OTHER PUBLICATIONS

Cohen, “An Introduction to PROC LOESS for Local Regression,” *SUGI Proceedings*, 1999.

Fisher et al., “Learning Informative Statistics: A Nonparametric Approach,” *Advances in Neural Information Processing Systems*, 12, 1999.

Ihler et al., “Nonparametric Estimators for Online Signature Authentication,” *In International Conference on Acoustics, Speech, and Signal Processing*, May 2001.

Wikipedia, “Non-parametric Statistics,” Retrieved from the Internet on Jan. 17, 2007: <URL: http://en.wikipedia.org/wiki/Non-parametric_statistics>.

* cited by examiner

APPARATUS AND METHOD FOR BATCH PROPERTY ESTIMATION

FIELD OF THE DISCLOSURE

The present disclosure generally relates to process control systems, and more particularly to determining estimates and/or predictions related to a property of a batch process.

BACKGROUND

Processes can be generally classified into three categories: continuous processes, semi-continuous processes, and batch processes. A continuous process is one which operates on raw materials or feed elements at a continuous rate to produce a continuous stream of product at an output. Examples of continuous processes include petroleum refining processes, vitamin C production processes and certain commodity chemical manufacturing processes. The values of process variables, such as temperature, pressure, flow rate, etc., typically remain the same over time at any location within a continuous process.

A batch process is a process which operates on a limited quantity of raw materials or feed elements as a group and which forces those feed elements through a series of process steps over time to produce an output product at the completion of the process steps. Usually, no new feed elements are introduced into a batch process during operation of the process steps. Examples of batch processes include the manufacture of beer, the manufacture of some pharmaceutical drugs and the production of many specialty chemicals. The values of process variables, such as temperature, pressure, flow rate, etc., typically change over time at one or more locations within a batch process.

A semi-continuous process is a continuous process which has batch process components therein. Typically, a semi-continuous process operates on a continuous supply of raw materials to produce a continuous stream of output product but has a set of, for example, mixers which mix a limited quantity of the materials being processed for a limited time somewhere within the process.

With regard to batch processes (and batch process components of semi-continuous processes) it may be useful to estimate a future state of a batch process based on past or current values of process variables such as temperature and pressure. For example, process state or variable estimation may enable a user to determine if the final output of a particular batch process will be acceptable. If it is estimated that the final product output will be below acceptable standards the batch process may be, for example, immediately discontinued. Alternatively, the batch process may be extended beyond the expected time required for the batch process so that the product output will be acceptable.

It is often very difficult, time consuming, and/or expensive, however, to accurately estimate a future state of a batch process. Thus, in one typical approach, a batch process operator may record process conditions of a successful batch process. Then, in subsequent batch processes, the operator may try to precisely maintain batch process conditions close to those of the known successful batch process. In this approach, it is assumed that the final batch process state should be close to that of the known successful batch process if the batch process conditions are maintained close to that of the known successful batch process. Other unmeasured conditions or conditions that cannot be precisely controlled, however, may affect the final batch process state. Therefore, even if many batch process conditions are precisely maintained, the final result of the batch process may vary from that of the known successful batch process.

In another typical approach, a mathematical equation (i.e., a parametric model) may be developed to estimate a rate of reaction of a process, where the equation is a function of measured process conditions. The equation can then be integrated to generate an estimate of the current state of the batch process. Development of such an equation that takes into account many process conditions, however, is usually extremely difficult. Therefore, the developed equation is simplified by making various assumptions, resulting in an equation that provides only a rough approximation of the rate of reaction. Accordingly, any estimate of the current state of the batch process based on such an equation provides only a rough approximation of the current state of the batch process.

SUMMARY

Embodiments according to the present invention provide methods and apparatus for generating an estimate of a property of a batch process. Generally speaking, a non-parametric model generates a plurality of rate of reaction estimates associated with the batch process. Each rate of reaction estimate may correspond, for example, to a particular time during the batch process. The plurality of rate of reaction estimates may be integrated to generate an estimate of a property of the batch process at a particular time.

In other embodiments, techniques for training the non-parametric model are provided. Generally speaking, the non-parametric model generates an estimate of the property at the ending time of a batch. This estimate may be compared to a measurement of the actual property of the batch at the ending time. The error between the estimate and the measurement may be used to adjust the non-parametric model. The non-parametric model may be similarly adjusted a plurality of times using data from a plurality of batch processes.

In still other embodiments, additional information may be generated based on the plurality of rate of reaction estimates generated by the non-parametric model. For example, an estimate of a difference between the property of the batch process at a particular time and a property of a model batch process at a corresponding time may be generated. This estimate may be used to generate additional information. For example, a prediction of the property at an expected ending time may be determined. As another example, an estimate of time remaining until the property reaches a desired value may be determined.

BRIEF DESCRIPTION OF THE DRAWINGS

The features and advantages of the examples described herein will be best appreciated upon reference to the following detailed description and the accompanying drawings, in which.

DETAILED DESCRIPTION

System Overview

Figure 1:
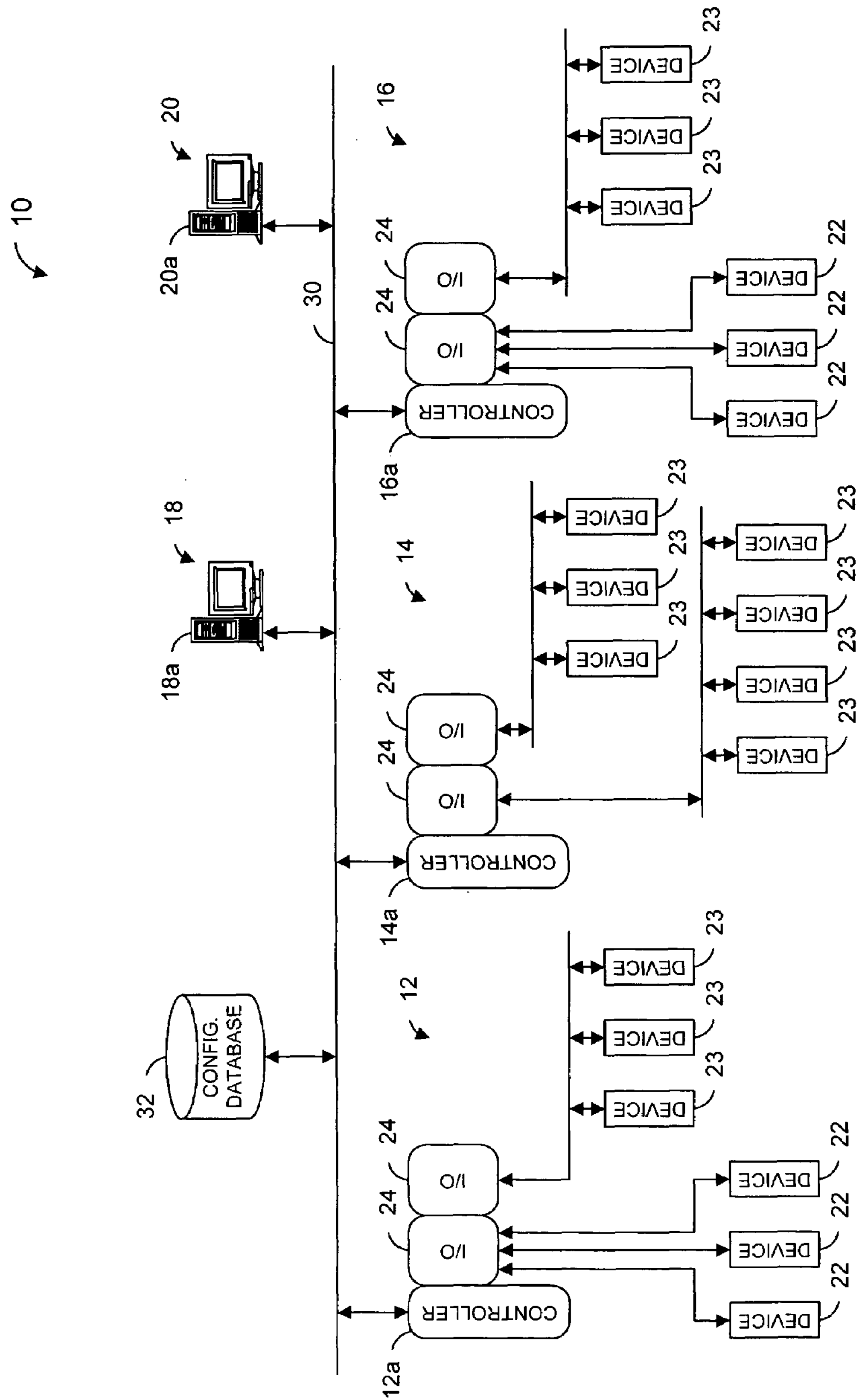
FIG. 1 is a block diagram of an example process plant.

FIG. 1 is a block diagram of an example process plant 10. The process plant 10 includes one or more nodes 12, 14, 16, 18 and 20. In the example process plant 10 of FIG. 1, each of the nodes 12, 14 and 16 includes a process controller 12*a*, 14*a*, 16*a* connected to one or more field devices 22 and 23 via input/output (I/O) devices 24 which may be, for example, Foundation Fieldbus interfaces, HART interfaces, etc. The controllers 12*a*, 14*a* and 16*a* are also coupled to one or more host or operator workstations 18*a* and 20*a* in the nodes 18 and 20 via a network 30 which may comprise, for example, one or more of a bus, a wired local area network (LAN) such as an Ethernet LAN, a wireless LAN, a wide area network (WAN), an intranet, etc. While the controller nodes 12, 14, 16 and the input/output and field devices 22, 23 and 24 associated therewith are typically located down within and distributed throughout the sometimes harsh plant environment, the operator workstation nodes 18 and 20 are usually located in control rooms or other less harsh environments easily accessible by controller personnel.

Generally speaking, the workstations 18*a* and 20*a* of the nodes 18 and 20 may be used to store and execute applications used to configure and monitor the process plant 10, and/or to manage devices 22, 23, 24 and controllers 12*a*, 14*a*, 16*a* in the process plant 10. Further, a database 32 may be connected to the network 30 and operate as a data historian and/or a configuration database that stores the current configuration of the process plant 10 as downloaded to and/or stored within the nodes 12, 14, 16, 18 and 20.

Each of the controllers 12*a*, 14*a* and 16*a*, which may be by way of example, the DeltaV™ controller sold by Emerson Process Management, may store and execute a controller application that implements a control strategy using a number of different, independently executed, control modules or blocks. The control modules may each be made up of what are commonly referred to as function blocks wherein each function block is a part or a subroutine of an overall control routine and operates in conjunction with other function blocks (via communications called links) to implement process control loops within the process plant 10. As is well known, function blocks typically perform one of an input function (such as that associated with a transmitter, a sensor or other process parameter measurement device), a control function (such as that associated with a control routine that performs PID, fuzzy logic, etc. control), or an output function which controls the operation of some device (such as a valve), to perform some physical function within the process plant 10. Of course hybrid and other types of function blocks exist and may be utilized. While a fieldbus protocol and the DeltaV™ system protocol may use control modules and function blocks designed and implemented in an object oriented programming protocol, the control modules could be designed using any desired control programming scheme including, for example, sequential function block, ladder logic, etc. and are not limited to being designed using function block or any other particular programming technique. As is typical, the configuration of the control modules as stored within the process control nodes 12, 14 and 16 is stored in the configuration database 32 which is accessible to applications executed by the workstations 18*a* and 20*a*.

In the system illustrated in FIG. 1, the field devices 22 and 23 coupled to the controllers 12*a*, 14*a* and 16*a* may be standard 4–20 ma devices, or may be smart field devices, such as HART, Profibus, or Foundation Fieldbus field devices, which include a processor and a memory. Some of these devices, such as Foundation Fieldbus field devices (labeled with reference number 23 in FIG. 1), may store and execute modules, or sub-modules, such as function blocks, associated with the control strategy implemented in the controllers 12*a*, 14*a* and 16*a*. Of course, the field devices 22, 23 may be any types of devices, such as sensors, valves, transmitters, positioners, etc. and the I/O devices 24 may be any types of I/O devices conforming to any desired communication or controller protocol such as HART, Foundation Fieldbus, Profibus, etc.

The controllers 12*a*, 14*a*, and 16*a* each include a processor that implements or oversees one or more process control routines, stored in a memory, which may include control loops, stored therein or otherwise associated therewith. The controllers 12*a*, 14*a*, and 16*a* communicate with the field devices 22, 23, the workstations 18*a*, 20*a* and the database 32 to control a process in any desired manner. The controllers 12*a*, 14*a*, 16*a* each may be configured to implement a control strategy or control routine in any desired manner.

In one embodiment, the controllers 12*a*, 14*a*, and 16*a* implement control strategies using what are commonly referred to as function blocks, wherein each function block is a part (e.g., a subroutine) of an overall control routine and operates in conjunction with other function blocks (via communications called links) to implement process control loops within the process plant 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process plant 10. Of course hybrid and other types of function blocks exist. Function blocks may be stored in and executed by, for example, the controller 12*a*, which is typically the case when these function blocks are used for, or are associated with standard 4–20 ma devices and some types of smart field devices such as HART devices, or may be stored in and implemented by the field devices themselves, which can be the case with Fieldbus devices.

Figure 2:
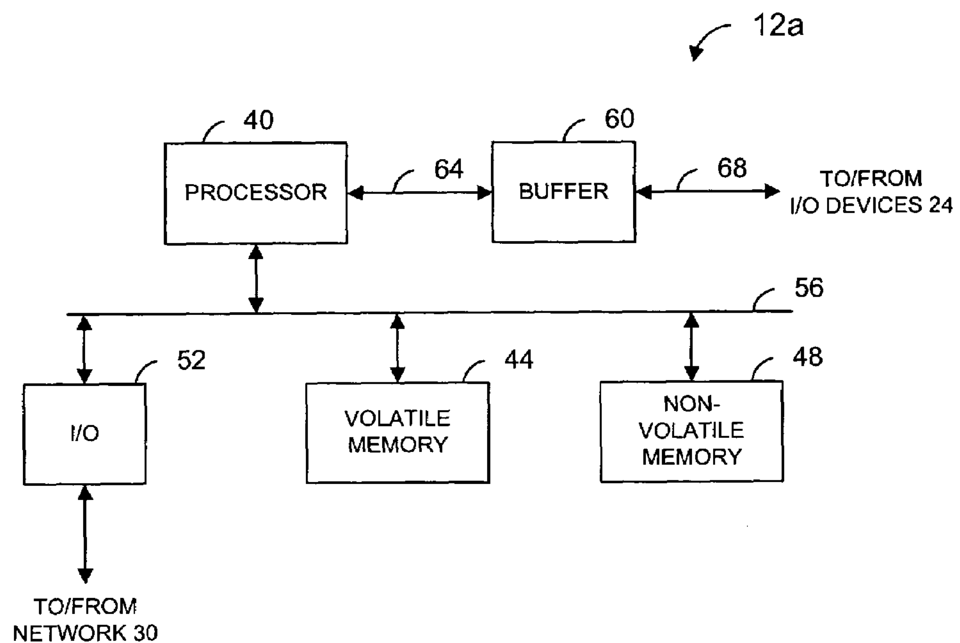
FIG. 2 is a block diagram of an example controller schematically illustrated in FIG. 1.

FIG. 2 is a block diagram of an example controller 12*a* (controllers 14*a* and 16*a* may comprise a same or similar device). The controller 12*a* may include at least one processor 40, a volatile memory 44, and a non-volatile memory 48. The volatile memory 44 may include, for example, a random access memory (RAM). In some embodiments, the RAM may be backed up by one or more batteries so that data is not lost in the event of a power failure. The non-volatile memory 48 may include, for example, one or more of a hard disk, a read-only memory (ROM), a compact disk ROM (CD-ROM), an erasable programmable ROM (EPROM), an electrically erasable programmable ROM (EEPROM), a digital versatile disk (DVD), a FLASH memory, etc. The controller 12*a* may also include a controller input/output (I/O) device 52. The processor 40, the volatile memory 44, the non-volatile memory 48, and the controller I/O device 52 may be interconnected via an address/data bus 56. In some embodiments, one or more of the volatile memory 44, non-volatile memory 48, and controller I/O device 52 may be coupled to the processor 40 via a bus separate from the address/data bus 56 (not shown), or coupled directly to the processor 40.

The controller 12*a* may also include a bidirectional buffer 60 coupled to the processor 40 via a bidirectional bus 64. The buffer 60 may be coupled to a plurality of I/O circuits 24 (FIG. 1) via a bidirectional bus 68. The controller 12*a* is coupled to the network 30 via the controller I/O device 52.

Figure 3:
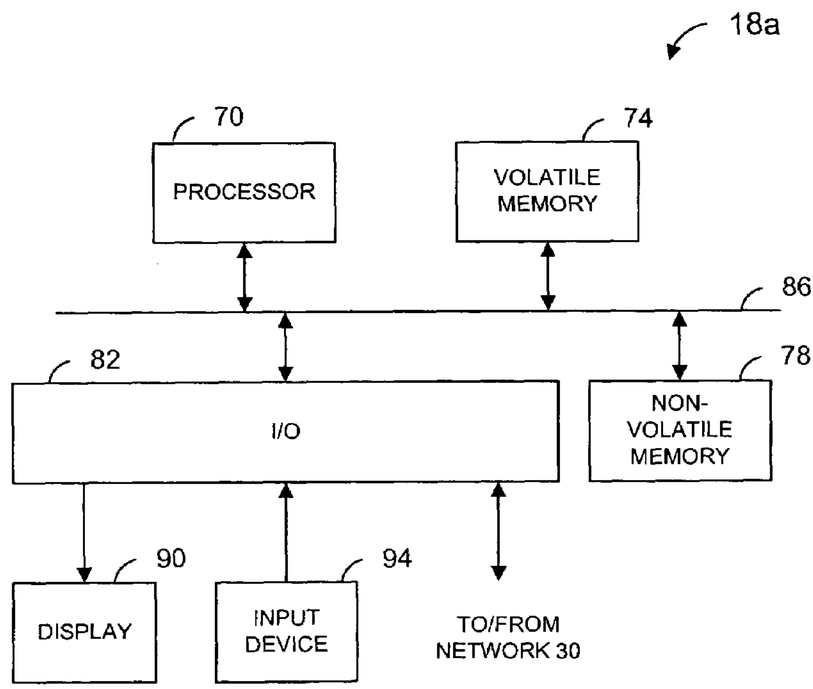
FIG. 3 is a block diagram of an example workstation schematically illustrated in FIG. 1.

A user interface application associated with a control node 12, 14, 16 may be stored on and executed by one or more of workstations 18*a* and 20*a*. FIG. 3 is a block diagram of an example workstation 18*a* (workstation 20*a* may comprise a same or similar device). The workstation 18*a* may include at least one processor 70, a volatile memory 74, and a non-volatile memory 78. The volatile memory 74 may include, for example, a RAM. In some embodiments, the RAM may be backed up by one or more batteries so that data is not lost in the event of a power failure. The non-volatile memory 78 may include, for example, one or more of a hard disk, a ROM, a CD-ROM, an EPROM, an EEPROM, a DVD, a FLASH memory, etc. The workstation 18*a* may also include a workstation I/O device 82. The processor 70, volatile memory 74, non-volatile memory 78, and workstation I/O device 82 may be interconnected via an address/data bus 86. The workstation 18*a* may also include at least one display 90 and at least one user input device 94. The user input device 94 may include, for example, one or more of a keyboard, a keypad, a mouse, etc. In some embodiments, one or more of the volatile memory 74, non-volatile memory 78, and workstation I/O device 82 may be coupled to the processor 70 via a bus separate from the address/data bus 86 (not shown), or coupled directly to the processor 70.

The display 90 and the user input device 94 are coupled with the workstation I/O device 82. Additionally, the workstation 18*a* is coupled to the network 30 via the workstation I/O device 82. Although the workstation I/O device 82 is illustrated in FIG. 3 as one device, it may comprise several devices. Additionally, in some embodiments, one or more of the display 90 and the user input device 94 may be coupled directly to the address/data bus 86 or the processor 70.

Overview of Batch Property Estimation Method

Figure 4:
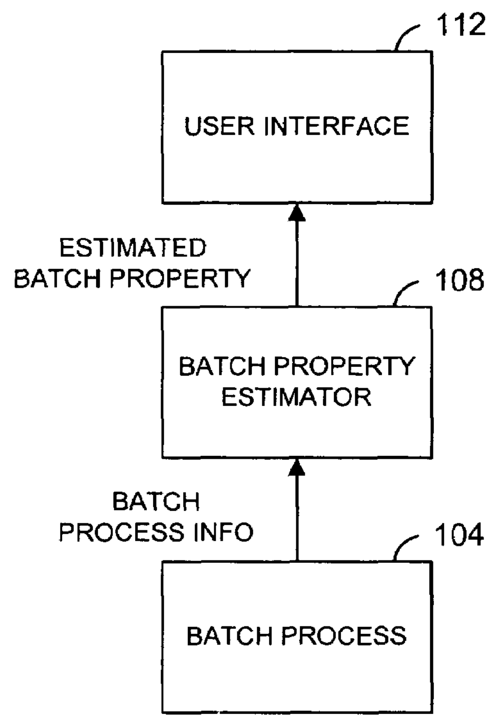
FIG. 4 is a block diagram illustrating an example of information flow in a system such as the process plant of FIG. 1.

FIG. 4 is a block diagram illustrating information flow associated with estimating a current property of a batch process. Information associated with a batch process 104 may be provided to a batch property estimator 108. The batch process information may include, for example, a time or indication of the start of the batch process, initial conditions such as the size of a vessel in which the batch process is occurring, the initial amounts of ingredients and/or catalysts, etc., measured conditions such as temperature, pressure, etc., the elapsed time from the start of the batch process, etc. Based on the batch process information, the batch property estimator 108 generates an estimate of a current property of the batch process. The batch property estimator 108 may then send the estimate to a user interface 112 for presentation to a user.

As an illustrative example, in a typical wood pulping process, wood chips are "digested" to dissolve the lignin that holds the wood fibers together. The resulting "clean" wood fibers can be further processed into a myriad of paper-based products. Thus, in this batch process, a batch property of interest may be the degree of delignification of the wood chips. It is to be understood that the wood pulp digestion process described above is merely one example of a batch process for which methods and apparatus described herein can be used to estimate a batch property. In general, embodiments of the claimed methods and apparatus described herein can be used to estimate many different batch properties in many different batch processes.

Referring now to FIGS. 1 and 4, the batch property estimator 108 may be implemented by one or more of a controller, such as the controllers 12*a*, 14*a*, 16*a*, and field devices, such as field devices 22, 23, associated with the controller. For example, the batch property estimator 108 may comprise a plurality of function blocks, where each function block is implemented by one or more of a controller and a field device or devices. The batch information may be provided to the batch property estimator 108 via, for example, field devices 22, 23, database 32, workstations 18*a*, 20*a*, or some other device. The estimate generated by the batch property estimator 108 may be sent to the user interface 112 via, for example, the network 30. The user interface 112 may be implemented by, for example, a computer such as workstation 18*a* or 20*a*.

Figure 5:
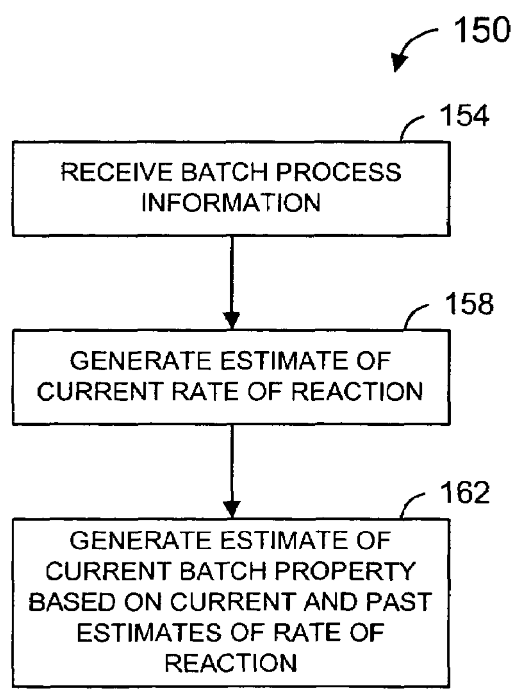
FIG. 5 is a flow diagram of one embodiment of a method for generating an estimate of a property of a batch process.

FIG. 5 is a flow diagram generally illustrating one embodiment of a method for generating the estimate of the batch property. The method 150 may be implemented by the batch property estimator 108 described with reference to FIG. 4. At block 154, information related to the batch process may be received. The batch process information may comprise the information described with reference to FIG. 4 (e.g., a time or indication of the start of the batch process, initial conditions, measured conditions, the elapsed time from the start of the batch process, etc.). At block 158, an estimate of a current rate of reaction is generated, where the rate of reaction is related to the batch property of interest. The current rate of reaction is generated based on the information received at block 154. In general, updated batch process information (e.g., measured conditions, elapsed time) may be received throughout the batch process, and the rate of reaction estimate may be generated repeatedly during the batch process. Then, at block 162, the rate of reaction estimates generated at block 158 are used to generate an estimate of the current batch property. As will be described in more detail below, in one embodiment the current batch property at a time T may be generated based on an integration of the rate of reaction estimates from the batch start time to time T.

Batch Property Estimator

Figure 6:
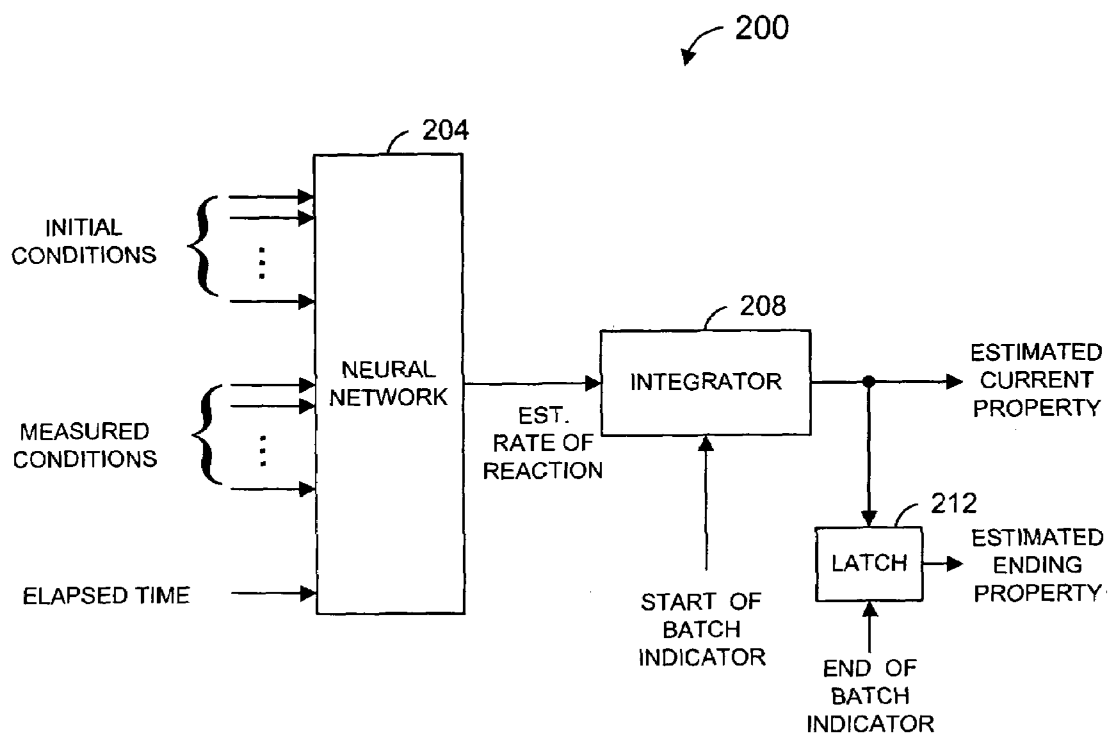
FIG. 6 is a block diagram of one embodiment of a batch property estimator.

FIG. 6 is a block diagram of one embodiment of a batch property estimator. The batch property estimator 200 comprises a neural network 204 communicatively coupled to an integrator 208. The neural network 204 receives as inputs batch process information including, for example, initial condition information, measured condition information, the elapsed time of the batch process, etc. The neural network is trained to generate rate of reaction estimates, where the rate of reaction is related to the batch property of interest. The neural network 204 generates the rate of reaction estimates based on the information received at its inputs. Training of the neural network 204 will be described below.

The rate of reaction estimates generated by the neural network 204 are provided to the integrator 208. In one embodiment, the integrator 208 (e.g., an accumulator) may be reset by the start of batch indicator. In this embodiment, the integrator 208 accumulates the estimates of the current rate of reaction generated by the neural network 204. The batch property estimator 200 may further comprise a latch 212 that receives the output of the integrator 208, and also receives an indication of the end of the batch process. The end of batch process indicator may be an indication of an expected time at which the batch process ends. The latch 212 latches the value at its input in response to the end of batch process indicator.

In operation, the trained neural network 204 generates a series of rate of reaction estimates corresponding to the batch process over time, where each generated rate of reaction estimate corresponds to a particular elapsed time from the start of the batch process. The integrator 208 integrates the estimates generated by the neural network 204, and generates a series of current batch property estimates, where each generated batch property estimate corresponds to a particular elapsed time from the start of the batch process. At the expected time at which the batch process is to end, the latch 212 latches the current batch property estimate. Thus, the latch 212 stores an estimate of the ending batch property. In other embodiments, the estimate of the ending batch property could be stored in a register, memory location, etc., in response to the end of batch process indicator.

Figure 7:
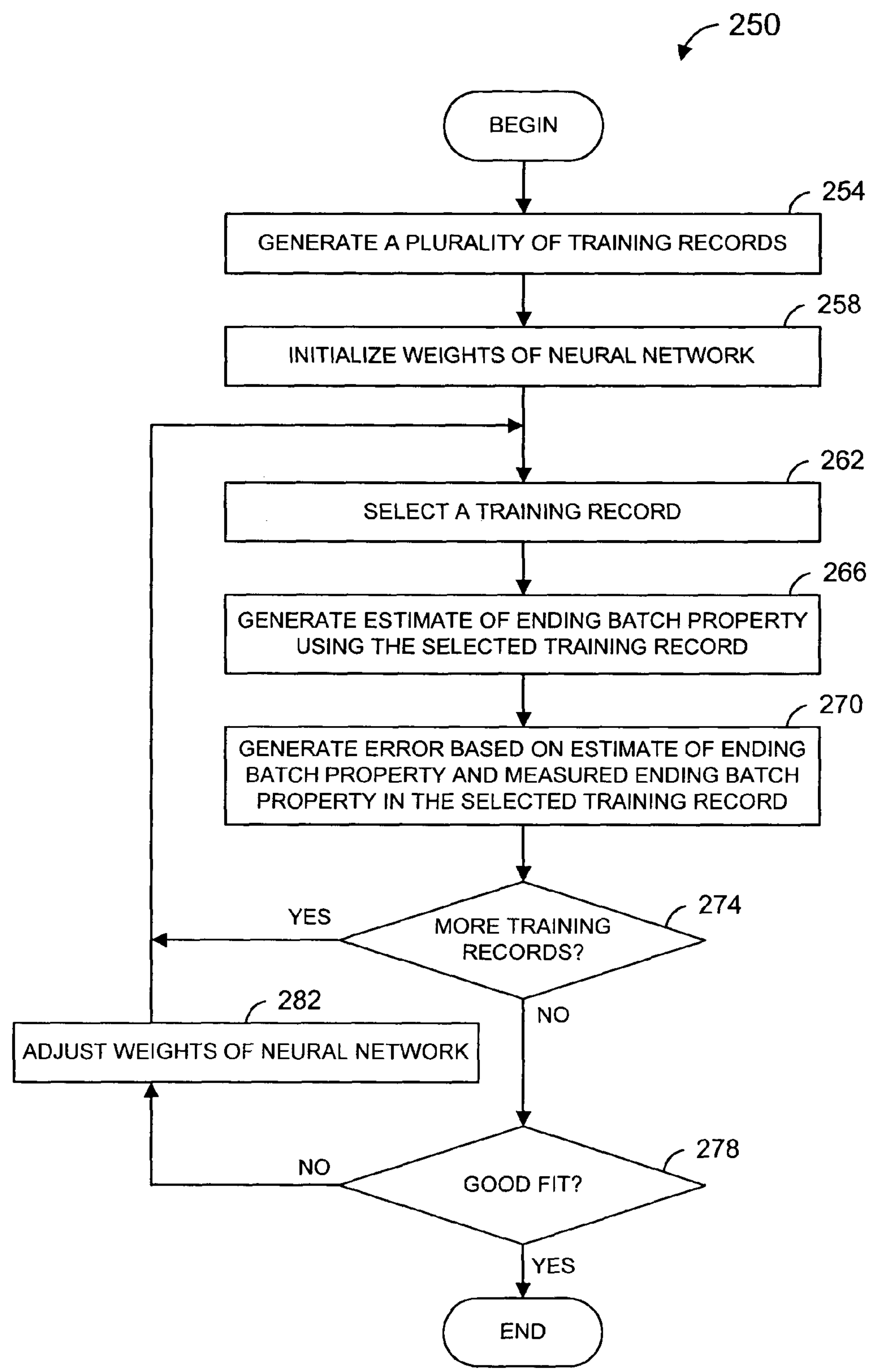
FIG. 7 is a flow diagram of one embodiment of a method for training the batch property estimator of FIG. 6.

FIG. 7 is a flow diagram of one embodiment of a method for training the neural network 204 of FIG. 6. The method 250 of FIG. 7 will be described with reference to FIG. 6. At block 254, a plurality of training records for the neural network 204 are generated. The training records may include data related to actual batch processes. For example, a training record corresponding to one actual batch process may include the initial conditions, sampled values of measured conditions during the batch process, etc., corresponding to the batch process. In general, a training record should include batch process data that would be provided as inputs to the neural network 204 during the batch process. Additionally, the training record may include other data that would be provided to the batch property estimator 200 during the batch process, such as the start of batch process and end of batch process indicators. Further, the training record should include a measured value of the ending batch property for the corresponding actual batch process.

At block 258, weights of the neural network 204 are initialized to starting values. Any of a number of techniques, including known techniques, may be used to determine the starting values of the weights of the neural network 204 weights. At block 262, a training record is selected. Generally, at block 262, a training record is selected that has not yet been used during the method 250.

At block 266, data from the selected training record is provided to the batch property estimator 200 to generate an estimate of the ending batch property. At block 270, an error value is generated based on the estimated ending batch property generated by the batch property estimator 200 and the measured ending batch property in the selected training record.

At block 274, it is determined whether there are more training records available for training the neural network 204. For example, it may be determined whether all of the training records in the plurality of training records generated at block 254 have been used to train the neural network 204. If more training records are available, the flow of the method 250 proceeds to block 262. If more training records are not available, the flow of the method 250 may proceed to block 278.

At block 278, it is determined whether the weights provide a fit that minimizes the error without overtraining the neural network. Any of a number of techniques, including known techniques, may be used to determine whether the weights provide a fit that minimizes the error without overtraining the neural network. If not, then new weights are computed at block 282 based on the error values generated at block 270. Then, blocks 254, 258, 262, 266, 270, and 274 may be repeated. Any of a number of techniques, including known techniques, may be used to adjust the weights of the neural network 204 based on the error values generated at block 270. If it is determined at block 278 that the weights provide a fit that minimizes the error without overtraining the neural network, the flow of the method 250 may end.

Figure 8:
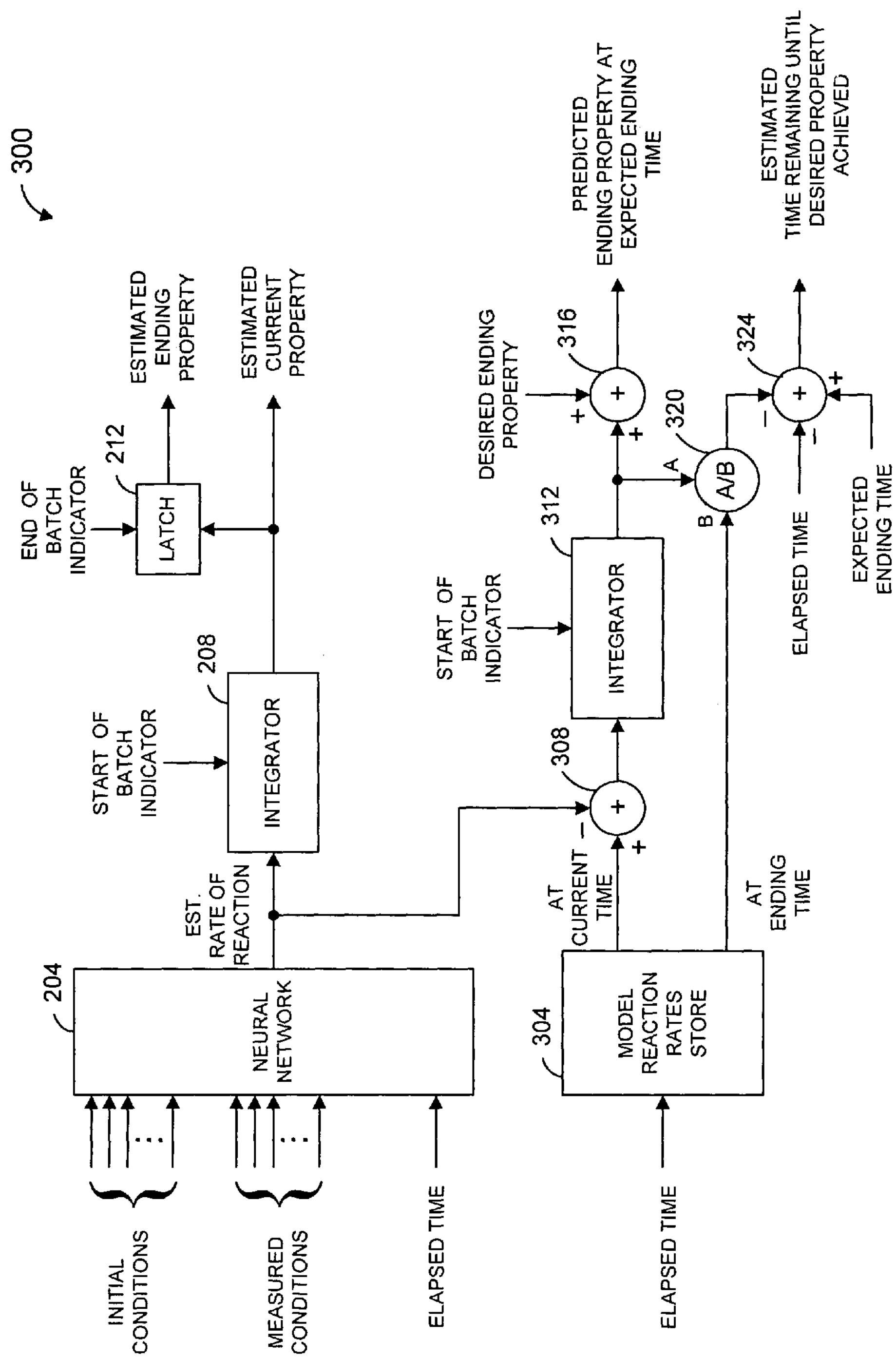
FIG. 8 is a block diagram of another embodiment of a batch property estimator.

FIG. 8 is a block diagram of another embodiment of a batch property estimator. The batch property estimator 300 comprises the neural network 204, the integrator 208, and the latch 212 as described with reference to FIG. 6. The neural network 204 may be trained in the same or a similar manner as described with reference to FIG. 7. The batch property estimator 300 also includes a model reaction rates store 304 that stores reaction rates for a model batch process. The model batch process may be a previously completed batch process in which the ending batch property was determined to be, for example, acceptable, typical, desired, etc. The reaction rates stored in the model reaction rates store 304 may be, for example, estimates of reaction rates as determined by a neural network such as the trained neural network 204. In one embodiment, the neural network 204 may be applied to data from the model batch process, and each output generated by the neural network 204 may be stored in the model reaction rates store 304. In another embodiment, only a subset of the outputs generated by the neural network 204 are stored in the model reaction rates store 304. For example, one output may be sampled from each of a plurality of groups of outputs, and only the samples stored in the model reaction rates store 304. As another example, groups of outputs generated by the neural network 204 may be processed to generate a value or values for each group, and the value(s) are stored in the model reaction rates store 304. For instance, groups of outputs from the neural network 204 could be averaged, filtered, etc., and the results stored in the model reaction rates store 304. In still another embodiment, the reaction rates stored in the model reaction rates store 304 may be estimates of reaction rates as determined by some means other than the neural network 204.

The model reaction rates store 304 may comprise, for example, a look up table stored in a memory such as a register set, a RAM, a ROM, a CD-ROM, an EPROM, an EEPROM, a DVD, a FLASH memory, a hard disk, a floppy disk, etc. The model reaction rates store 304 may provide two outputs: a first output that corresponds to the model rate of reaction at the current time; and a second output that corresponds to the model rate of reaction at the end of the model batch process (hereinafter referred to as the "model rate of reaction at the ending time"). The model reaction rates store 304 may receive as an input an indication of the current elapsed time of the batch process.

The model rate of reaction at the current time output may be, for example, an entry in a look up table as indexed by a look up table index. The look up table index may be generated using the current elapsed time input to the model reaction rates store 304. The model rate of reaction at the ending time output may be, for example, a particular value stored in the look up table, or value stored separately from the look up table. The model rate of reaction at the ending time may be based on one or more reaction rate estimates generated for the model batch process, for example, by the neural network 204 or some other means, near the end of the model batch process. For example, the model rate of reaction at the ending time may be, for example, a sample of, an average of, a filtered value of, etc. estimates of reaction rates of the model batch process near the end of the model batch process.

The first output of the model reaction rates store 304 is provided to an adder 308. Additionally, the output of the neural network 204 is provided as another input to the adder 308. The adder 308 subtracts the output of the neural network 204 from the first output of the model reaction rates store 304 to generate an output. The output of the adder 308 is provided to an integrator 312, which may be of a same or similar type as that of the integrator 208. The integrator 312 receives as a second input the start of batch indicator. In operation, the integrator 312 integrates the output of the adder 308 from the beginning of the batch process. The output of the integrator 312 is an estimation of the difference between the current property of the batch process and that of the model batch process at a corresponding time during the model batch process. The output of the integrator 312 is provided to an adder 316. A desired ending property of the batch process is provided as another input to the adder 316. The desired ending property may be, for example, the ending batch property of the model batch process, an expected ending batch property, etc. The adder 316 adds its inputs to generate an output that is a prediction of the batch property at the expected ending time.

In operation, the model reaction rates store 304 provides a series of values to the adder 308 as the elapsed time progresses. Additionally, the neural network 204 also generates a series of values as the elapsed time progresses. The adder 304 generates a series of values based on the outputs of the neural network 204 and the model reaction rates store 304. The integrator 312 integrates the output of the adder 308 from the start of the batch process. The output of the integrator 312 is provided to the adder 316, which adds the output of the integrator 312 with the desired ending property.

Figure 9:
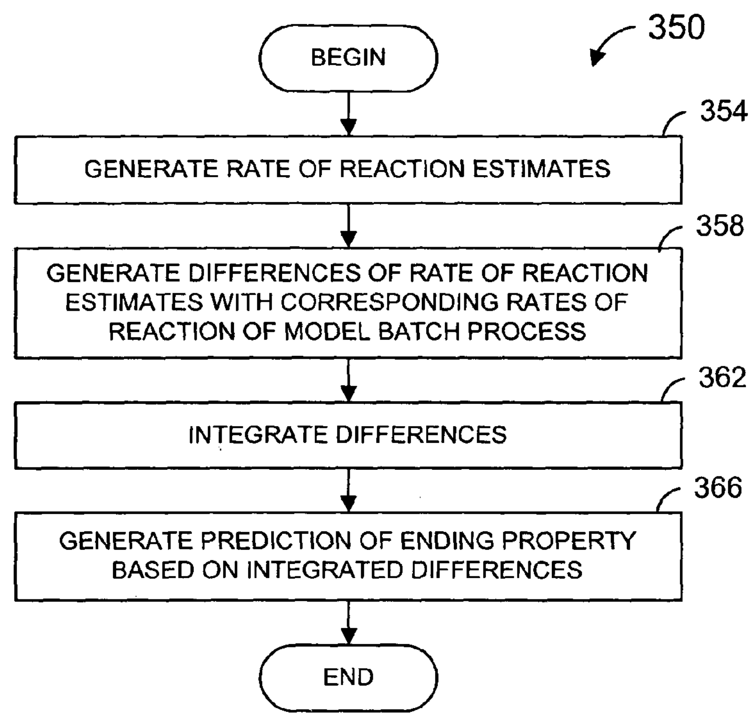
FIG. 9 is a flow diagram of one embodiment of a method for generating a prediction of a property of a batch process at an ending time.

FIG. 9 is a flow diagram of one embodiment of a method for generating a prediction of an ending property of a batch process. The method 350 of FIG. 9 may be implemented, for example, by an apparatus such as the apparatus 300 of FIG. 8 or another apparatus, by a processor configured according to software, etc. For ease of explanation, the flow of FIG. 9 will be described with reference to FIG. 8. It is to be understood, however, that the flow of FIG. 9 can be implemented by various means other than the apparatus 300.

At block 354, rate of reaction estimates for a batch process are generated during the batch process. For example, the rate of reaction estimates may be generated by the neural network 204. At block 358, differences between the rate of reaction estimates generated at block 354 and corresponding rates of reactions of a model batch process are generated. For example, the first output of the model reaction rates store 304 is a reaction rate of the model process that corresponds to the rate of reaction estimate generated by the neural network 204. The adder 308 then generates differences between the output of the neural network 204 and the corresponding output of the model reaction rates store 304.

At block 362, the differences generated at block 358 are integrated to generate an estimation of the difference between the current property of the batch process and that of the model batch process at a corresponding time during the model batch process. In one embodiment, the differences generated at block 358 are accumulated. The integrator 312, for example, may integrate the output of the adder 308. At block 366, the integrated differences value generated at block 362 is used to generate a predicted property of the batch process at the expected ending time. For instance, the integrated differences value may be added to a desired ending property of the batch process. For example, the adder 316 may add the output of the integrator 312 with the desired ending property of the batch process.

Referring now to FIG. 8, the second output of the model reaction rates store 304, which corresponds to the model reaction rate near the end of the model batch process, is provided to a divider 320. Additionally, the output of the integrator 312, which is an estimation of the difference between the current property of the batch process and that of the model batch process at a corresponding time, is provided as another input to the divider 320. The divider 320 divides the output of the integrator 312 by the second output of the model reaction rates store 304 to generate an output. The output of the divider 320 is an estimate of a time deviation from the expected ending time of the batch process, where the time deviation is indicative of a time at which the property of the batch process will reach a desired value. In another embodiment, the first output of the model reaction rate store 304 may be provided to the divider 320.

The output of the divider 320 is provided to an adder 324. Also provided to the adder 324 as additional inputs are the elapsed time and the expected batch ending time. The adder 324 subtracts the output of the divider 320 and the elapsed time from the expected batch ending time to generate an estimate of the time remaining until the desired batch property value is reached.

Figure 10:
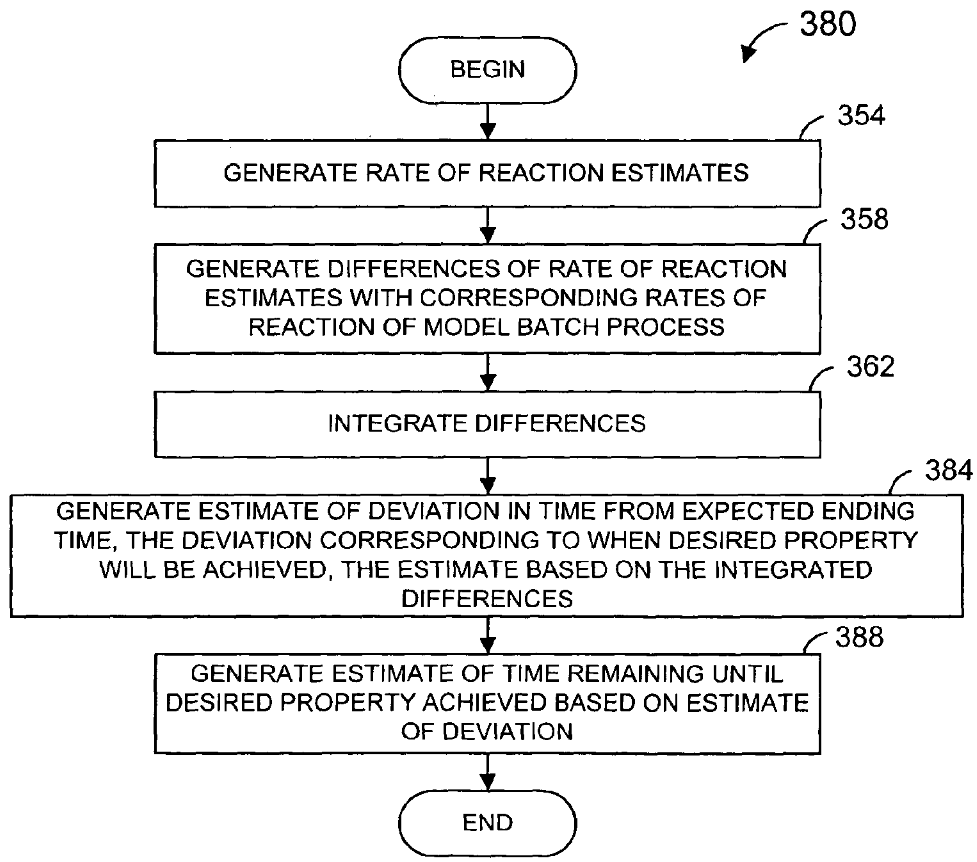
FIG. 10 is a flow diagram of one embodiment of a method for generating an estimate of time remaining until a property of a batch process reaches a desired value.

FIG. 10 is a flow diagram of one embodiment of a method for generating an estimate of time remaining until a desired batch property is achieved. The method 380 of FIG. 10 may be implemented, for example, by an apparatus such as the apparatus 300 of FIG. 8 or another apparatus, by a processor configured according to software, etc. For ease of explanation, the flow of FIG. 10 will be described with reference to FIG. 8. It is to be understood, however, that the flow of FIG. 10 can be implemented by various means other than the apparatus 300.

Blocks 354, 358, and 362 are the same as described with reference to FIG. 9. At block 384, the integrated differences value generated at block 362 is used to generate an estimate of a deviation from the expected ending time, where the deviation is indicative of a time when the desired batch property will be achieved. In one embodiment, the integrated differences value generated at bock 362 can be divided by a rate of reaction of the model batch process. For instance, the rate of reaction of the model batch process corresponding to the end of the model batch process, or corresponding to the current time, could be used. Referring to FIG. 8, as one example, the divider 320 may divide the output of the integrator 312 by the second output of the model reaction rates store 304.

At block 388, the estimate of the deviation generated at block 384 is used to generate an estimate of the time remaining until the desired property is achieved. In one embodiment, the deviation generated at block 384 as well as the current elapsed time are subtracted from the expected ending time of the batch process to generate the estimate of the time remaining. Referring to FIG. 8, as one example, the adder 324 may subtract the output of the divider 320 and the elapsed time from the expected ending time to generate the estimate of the time remaining.

Figure 11:
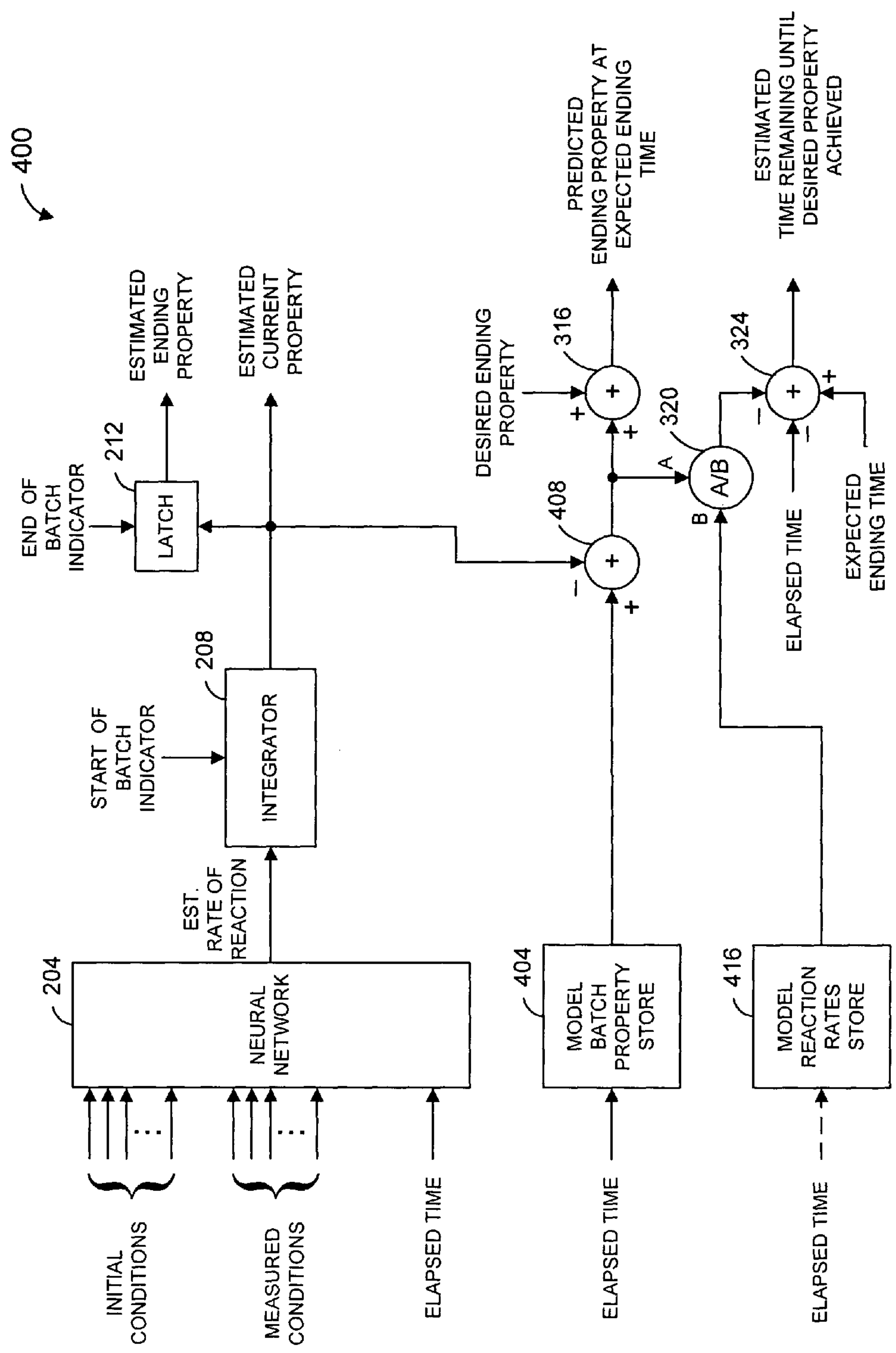
FIG. 11 is a block diagram of yet another embodiment of a batch property estimator.

FIG. 11 is a block diagram of yet another embodiment of a batch property estimator. The batch property estimator 400 comprises the neural network 204, the integrator 208, the latch 212, the adder 316, the divider 320, and the adder 324 as described with reference to FIGS. 6 and 8. The batch property estimator 400 also comprises a model batch property store 404 that stores estimates of the property of a model batch process at various times during the model batch process. The model batch process may be as described previously with reference to FIG. 8. The property estimates stored in the model batch property store 404 may be, for example, estimates of current property of the model batch process as determined by the batch property estimator 200 of FIG. 6. In one embodiment, the batch property estimator 200 may be applied to data from the model batch process, and each output generated by the integrator 208 may be stored in the model batch property store 404. In another embodiment, only a subset of the outputs generated by the integrator 208 are stored in the model batch property store 404. For example, one output may be sampled from each of a plurality of groups of outputs, and only the samples stored in the model batch property store 404. As another example, groups of outputs generated by the integrator 208 may be processed to generate a value or values for each group, and the value(s) are stored in the model batch property store 404. For instance, groups of outputs from the integrator 208 could be averaged, filtered, etc., and the results stored in the model batch property store 404. In still another embodiment, the batch properties in the model batch property store 404 may be estimates of current batch properties of the model batch process as determined by some means other than the batch property estimator 200. In yet another embodiment, the batch properties in the model batch property store 404 may be measurements of current batch properties of the model batch process taken during the model batch process. For example, samples of a gas, liquid, solid, etc. may be taken during the model batch process at various times during the model batch process. These samples could then be analyzed to determine the batch property at the time the sample was taken.

The model batch property store 404 may comprise, for example, a look up table stored in a memory such as a register set, a RAM, a ROM, a CD-ROM, an EPROM, an EEPROM, a DVD, a FLASH memory, a hard disk, a floppy disk, etc. The model batch property store 404 may generate an output, and may receive as an input an indication of the current elapsed time of the batch process. The output may be, for example, an entry in a look up table as indexed by a look up table index. The look up table index may be generated using the current elapsed time input to the model batch property store 404. The output of the model batch property store corresponds to the estimated (or measured) property of the model batch process at a time corresponding to the elapsed time.

The output of the model batch property store 404 is provided to an adder 408. Additionally, the output of the integrator 208 is provided as another input to the adder 408. The adder 408 subtracts the output of the integrator 208 from the output of the model batch property store 404 to generate an output. The output of the adder 408 is an estimation of the difference between the current property of the batch process and that of the model batch process at a corresponding time during the model batch process. The output of the adder 408 is provided to the adder 316.

The output of the adder 408 is an estimate of the difference between the current property of the batch process and that of the model batch process at a corresponding time during the model batch process. Thus, the output of the adder 408 is similar to the output of the integrator 312 of FIG. 8.

Figure 12:
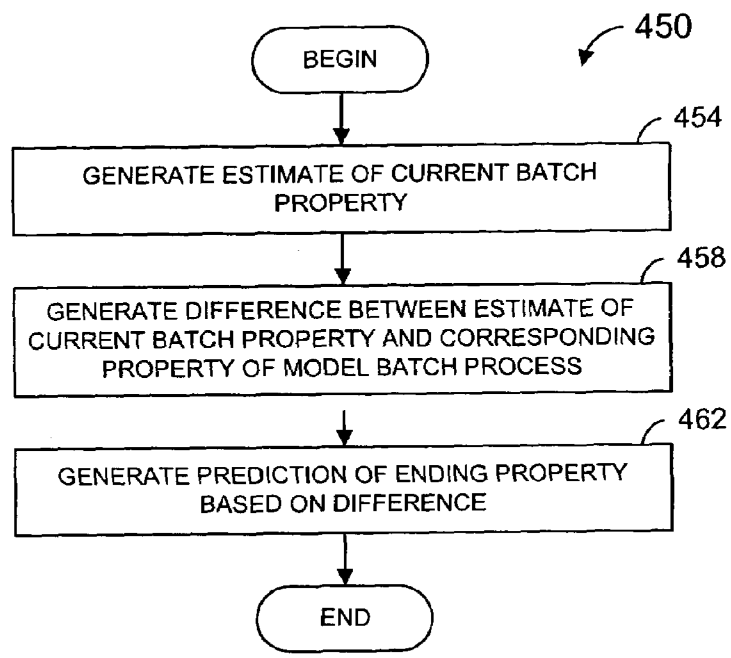
FIG. 12 is a flow diagram of another embodiment of a method for generating a prediction of a property of a batch process at an ending time.

FIG. 12 is a flow diagram of another embodiment of a method for generating a prediction of an ending property of a batch process. The method 450 of FIG. 12 may be implemented, for example, by an apparatus such as the apparatus 400 of FIG. 11 or another apparatus, by a processor configured according to software, etc. For ease of explanation, the flow diagram of FIG. 12 will be described with reference to FIG. 11. It is to be understood, however, that the flow of diagram FIG. 12 can be implemented by various means other than the apparatus 400.

At block 454, an estimate of the current property for a batch process is generated during the batch process. For example, the current property estimate may be generated by the integrator 208. At block 458, a difference between the current property estimate generated at block 454 and a property of the model batch process at a time corresponding to the current elapsed time of the batch process is generated. For instance, the output of the model batch property store 404 is an estimate (or measurement) of the property of the model process that corresponds to the elapsed time. The adder 408 generates a difference between the output of the integrator 208 and the corresponding output of the model batch property store 404. The difference generated at block 458 is an estimate of the difference between the current property of the batch process and that of the model batch process at a corresponding time during the model batch process.

At block 462, the difference generated at block 458 is used to generate a predicted property of the batch process at the expected ending time. For instance, the difference generated at block 458 may be added to a desired ending property of the batch process. For example, the adder 316 may add the output of the adder 408 with the desired ending property of the batch process.

Referring now to FIG. 11, the batch property estimator 400 may include a model reaction rates store 416. In one embodiment, the model reaction rates store may store a value that corresponds to the model reaction rate near the end of the model batch process, similar to the corresponding value described with reference to the second output of the model reaction rates store 304 of FIG. 8. In another embodiment, the model reaction rates store 416 may store a plurality of values corresponding to the values described with reference to the first output of the model reaction rates store 304 of FIG. 8. In either embodiment, the model reaction rate store 416 may comprise, for example, a single value or a look up table stored in a memory such as a register, a register set, a RAM, a ROM, a CD-ROM, an EPROM, an EEPROM, a DVD, a FLASH memory, a hard disk, a floppy disk, etc. In embodiments in which a plurality of values are stored, the model reaction rates store 416 may receive as an input an indication of the current elapsed time of the batch process. The output may be, for example, an entry in a look up table as indexed by a look up table index. The look up table index may be generated using the current elapsed time input to the model reaction rates store 416. In embodiments in which the model reaction rates store 416 receives as an input the current elapsed time, the output of the model reaction rates store 416 may correspond to the reaction rate of the model batch process at a time corresponding to the elapsed time.

The output of the model reaction rates store 416 is provided to the divider 320. Additionally, the output of the adder 408, which is an estimation of the difference between the current property of the batch process and that of the model batch process at a corresponding time, is provided as another input to the divider 320. The divider 320 divides the output of the adder 408 by the output of the model reaction rates store 416 to generate an output. The output of the divider 320 is an estimate of a time deviation from the expected ending time of the batch process, where the time deviation is indicative of a time at which the property of the batch process will reach a desired value.

Figure 13:
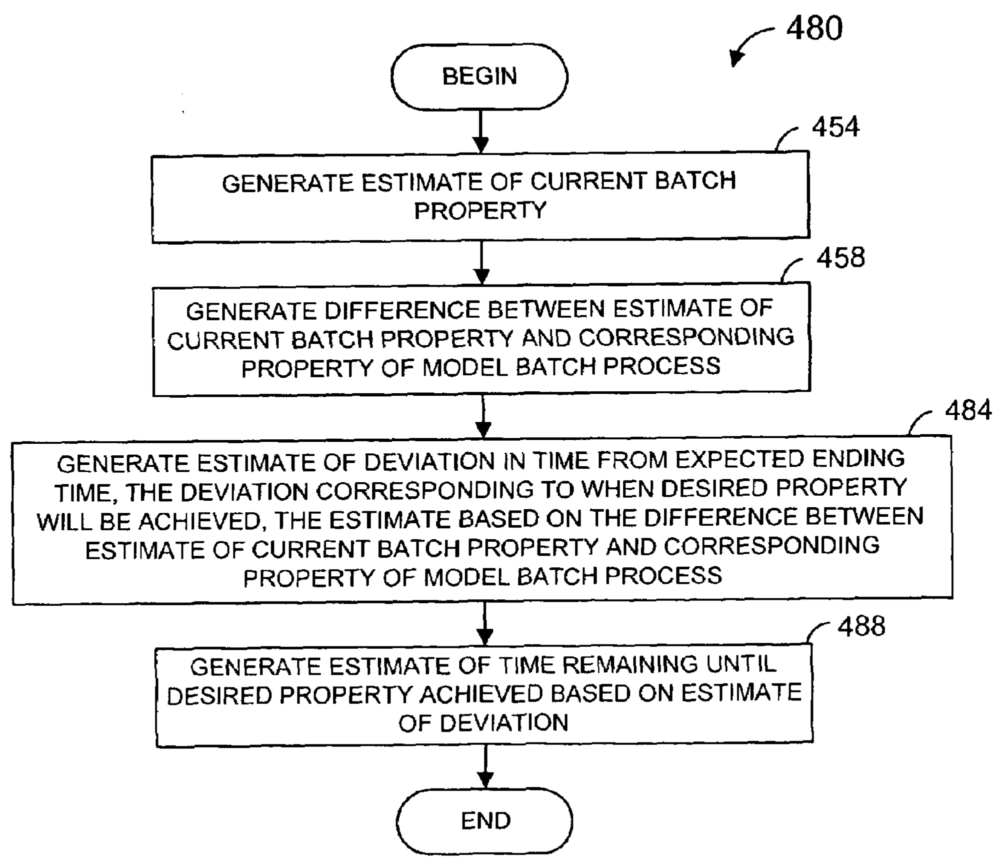
FIG. 13 is a flow diagram of another embodiment of a method for generating an estimate of time remaining until a property of a batch process reaches a desired value.

FIG. 13 is a flow diagram of one embodiment of a method for generating an estimate of time remaining until a desired batch property is achieved. The method 480 of FIG. 13 may be implemented, for example, by an apparatus such as the apparatus 400 of FIG. 11 or another apparatus, by a processor configured according to software, etc. For ease of explanation, the flow of FIG. 13 will be described with reference to FIG. 11. It is to be understood, however, that the flow of FIG. 13 can be implemented by various means other than the apparatus 400.

Blocks 454 and 458 are the same as described with reference to FIG. 12. At block 484, the difference generated at block 458 is used to generate an estimate of a deviation from the expected ending time, where the deviation is indicative of a time when the desired batch property will be achieved. In one embodiment, the difference generated at bock 458 can be divided by a rate of reaction of the model batch process. For instance, the rate of reaction of the model batch process corresponding to the end of the model batch process, or corresponding to the current elapsed time, could be used. Referring to FIG. 11, as one example, the divider 320 may divide the output of the adder 408 by the output of the model reaction rates store 416.

At block 488, the estimate of the deviation generated at block 484 is used to generate an estimate of the time remaining until the desired property is achieved. In one embodiment, the deviation generated at block 484 as well as the current elapsed time are subtracted from the expected ending time of the batch process to generate the estimate of the time remaining. Referring to FIG. 11, as one example, the adder 324 may subtract the output of the divider 320 and the elapsed time from the expected ending time to generate the estimate of the time remaining.

Figure 14:
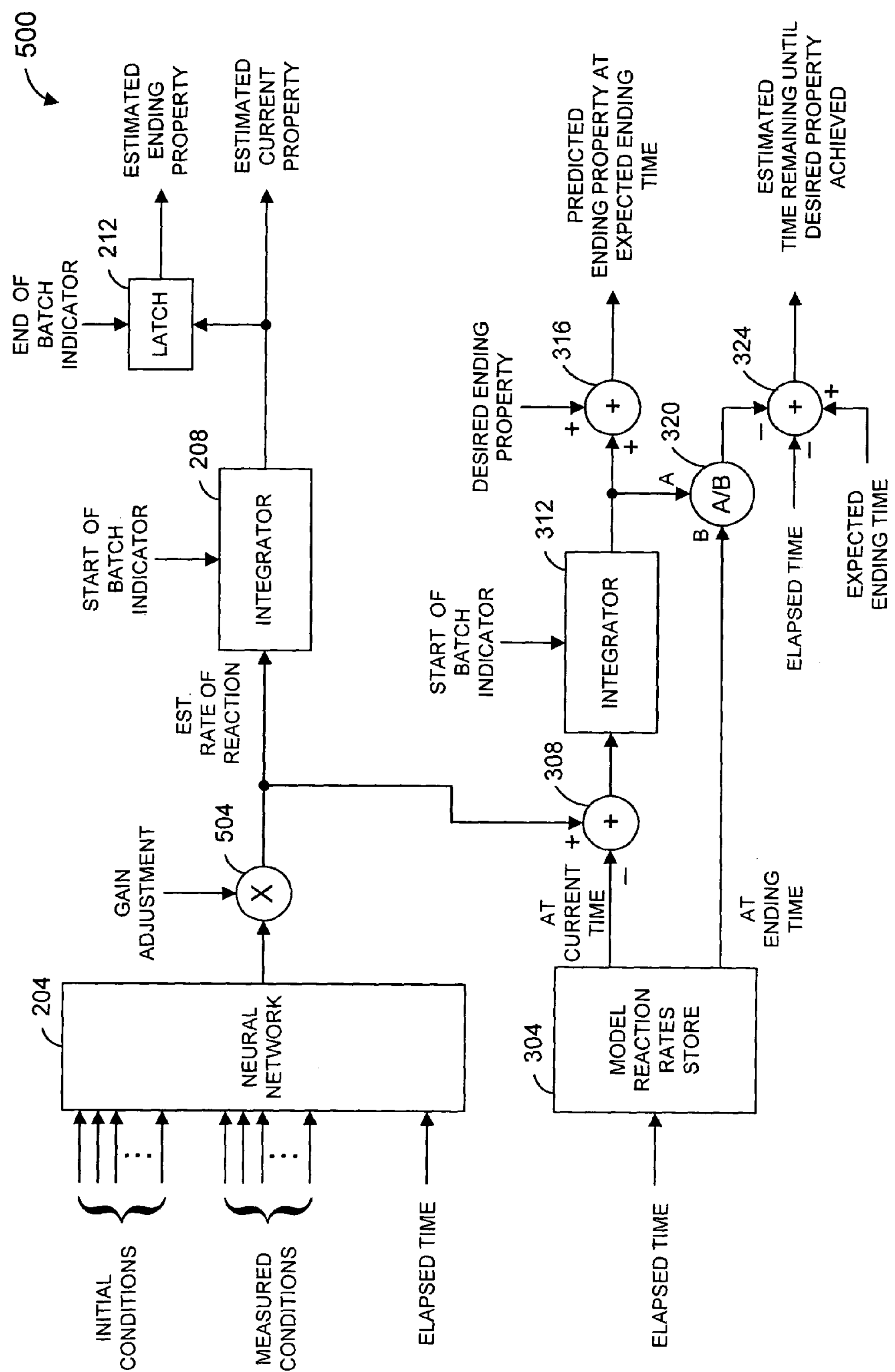
FIG. 14 is a block diagram of still another embodiment of a batch property estimator.

FIG. 14 is a block diagram of yet another embodiment of a batch property estimator. The batch property estimator 500 comprises the components of the batch property estimator 300 as described with reference to FIG. 8, and additionally includes a multiplier 504. The output of the neural network 204 is provided to the multiplier 504, which multiplies the output of the neural network 204 by a gain adjustment. The output of the multiplier 504 is then provided to the integrator 208 and the adder 308. The gain adjustment can be used to correct for a gain bias of the neural network 204 without having to re-train the neural network 204.

Figure 15:
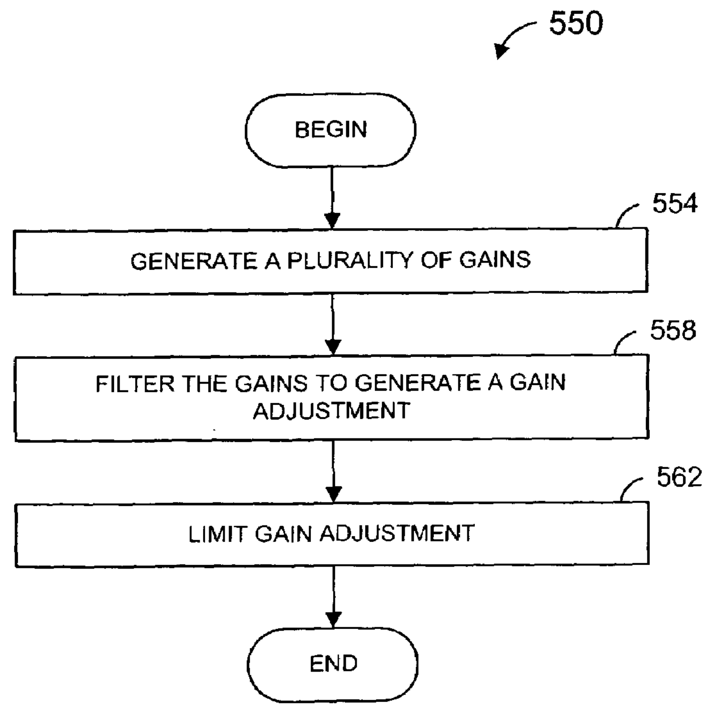
FIG. 15 is a flow diagram of one embodiment of a method for generating the gain adjustment of FIG. 14.

In operation, the gain adjustment value may be initialized to one, thus providing no gain adjustment. If it is determined that a gain adjustment is needed, an appropriate gain adjustment value can be generated. FIG. 15 is a flow diagram of one embodiment of a method for generating the gain adjustment value of FIG. 14. The method 550 of FIG. 15 will be described with reference to FIG. 14. At block 554, a plurality of gains for the batch property estimator 500 are determined. For example, a plurality of gains may be determined by dividing measured ending batch properties by corresponding estimates generated by the batch property estimator 500. Then, at block 558, the plurality of gains generated at block 554 may be filtered to generate a gain adjustment value. For example, the gains may be averaged, low pass filtered, etc.

Then, at block 562, the gain adjustment value may be limited. For example, if the gain adjustment value is above a first threshold, the gain adjustment value may be set to the first threshold. Similarly, if the gain adjustment value is below a second threshold, the gain adjustment value may be set to the second threshold.

The gain adjustment value may be updated after each batch is completed and a measurement of the ending property is available. Also, the gain adjustment value may be updated after several batches have been completed and measurements of the corresponding ending properties are available.

The batch property estimator 500 is a modification of the batch property estimator 300 of FIG. 8. The batch property estimator 200 of FIG. 6 and the batch property estimator 400 of FIG. 11 may be similarly modified.

In other embodiments, the multiplier 504 may be replaced with an adder to add an offset adjustment. The offset adjustment can be used to correct for an offset of the neural network 204 without having to re-train the neural network 204. The offset adjustment may be determined in a manner similar to that described above with reference to FIG. 15. However, instead of determining a plurality of gains at block 554, a plurality of offsets may be determined. For example, the plurality of offsets may be determined by subtracting estimates generated by the batch property estimator from corresponding measured ending batch properties. In still other embodiments, an adder to add an offset adjustment may be used in addition to the multiplier 504. For example, the adder may receive the output of the multiplier 504, and the adder's output may be provided to the integrator 208. U.S. patent application Ser. No. 09/590,630, filed Jun. 8, 2000, entitled "Adaptive Predictive Model in a Process Control System," and assigned to the assignee of the present application, describes various techniques that may be used to modify the output of the neural network 204, such as providing an offset adjustment. U.S. patent application Ser. No. 09/590,630 is hereby incorporated by reference herein in its entirety for all purposes.

Referring now to FIGS. 1, 6, 8, 11, and 14, some or all of the outputs generated by the batch property estimator 200, 300, 400, 500 may be transmitted to a user interface for presentation, for example, to an operator. For instance, some or all of the generated outputs may be transmitted by, for example, controller 12*a*, 14*a*, and/or 16*a* to a user interface implemented by, for example, workstation 18*a* or 20*a*. The generated outputs may be transmitted via the network 30, for example.

An operator may use the generated outputs, for example, to decide whether to immediately discontinue the batch process, to modify batch process variables (e.g., add ingredients, increase/decrease temperature, etc.), to shorten or lengthen the batch processing time, etc. Alternatively, the generated outputs may be used to automatically immediately discontinue the batch process, to modify batch process variables, to shorten or lengthen the batch processing time, etc. For example, the generated outputs could be provided to a controller application implemented in whole or in part by a controller such as controller 12*a*, 14*a*, or 16*a*.

Although the above described embodiments have included a neural network model, in other embodiments, other non-parametric models also may be employed (e.g., a dynamic linear estimator, a finite impulse response model, etc.).

Various block diagrams and flow diagrams have been described. It will be understood by those of ordinary skill in the art that each of the blocks illustrated in these block diagrams and flow diagrams may be implemented, in whole or in part, by software, hardware, and/or firmware. Each block, or a portion thereof, may be designed using any of various design tools, including graphical design tools or any other type of software/hardware/firmware programming or design tools.

In some embodiments, each of the blocks illustrated in FIGS. 6, 8, 11, and 14 may be implemented as a function block in a process control system. The function blocks may be implemented, for example, by a controller, such as controllers 12*a*, 14*a*, 16*a* of FIG. 1, and/or field devices, such as field devices 22, 23 of FIG. 1. Each function block may be implemented, in whole or in part, by software, hardware, or firmware. In other embodiments, some or all of the blocks illustrated in FIGS. 6, 8, 11, and 14 may be implemented or designed using other conventions, such as ladder logic, sequential function charts, etc. or using any other desired programming language or paradigm.

If a block of one of the previously described block diagrams or flow diagrams is implemented, in whole or in part, by software, the software may be stored on a tangible medium such as a RAM, a ROM, a CD-ROM, an EPROM, an EEPROM, a DVD, a FLASH memory, a hard disk, a floppy disk, etc. Each block, or a portion thereof, may be implemented in any desired software format, such as using object oriented programming, using ladder logic, sequential function charts, function block diagrams, or using any other software programming language or design paradigm. With regard to the flow diagrams described previously, persons of ordinary skill in the art will readily appreciate that the flow diagrams may be implemented by software executed by a processor, or the entire flow or parts thereof could alternatively be executed by a device other than a processor, and/or embodied in firmware and/or dedicated hardware in a well known manner.

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

What is claimed is:

1. A method for estimating a property of a batch process, the method comprising:

determining rate of reaction estimates associated with the batch process using a non-parametric model; and determining an estimate of a property of the batch process at a particular time based on the rate of reaction estimates.

2. A method as defined in claim 1, wherein determining the estimate of the property comprises integrating the rate of reaction estimates.

3. A method as defined in claim 2, wherein integrating the rate of reaction estimates comprises accumulating the rate of reaction estimates.

4. A method as defined in claim 1, wherein the non-parametric model comprises a neural network.

5. A method as defined in claim 1, further comprising determining an estimate of a difference between the property of the batch process at the particular time and a property of a model batch process at a time during the model batch process that corresponds to the particular time.

6. A method as defined in claim 5, wherein determining the estimate of the difference between the property of the batch process and the property of the model batch process comprises:

determining differences between the rate of reaction estimates of the batch process and rate of reaction estimates of the model batch process; and integrating the differences between the rate of reaction estimates of the batch process and the rate of reaction of the model batch process.

7. A method as defined in claim 5, wherein determining the estimate of the difference between the property of the batch process and the property of the model batch process comprises subtracting the estimate of the property of the batch process at the particular time from a property of the model batch process at the time during the model batch process that corresponds to the particular time.

8. A method as defined in claim 7, wherein the property of the model batch process at the time during the model batch process that corresponds to the particular time is an estimated property.

9. A method as defined in claim 7, wherein the property of the model batch process at the time during the model batch process that corresponds to the particular time is a measured property.

10. A method as defined in claim 5, further comprising determining a predicted property at a batch process ending time based on the estimate of the difference between the property of the batch process at the particular time and the property of the model batch process at the time during the model batch process that corresponds to the particular time.

11. A method as defined in claim 10, wherein determining the predicted property at the batch process ending time comprises adding a desired property at the batch process ending time with the estimate of the difference between the property of the batch process at the particular time and the property of the model batch process at the time during the model batch process that corresponds to the particular time.

12. A method as defined in claim 1, further comprising determining an estimate of a deviation between an actual time at which the property of the batch process reaches a desired value and an expected time at which the batch process reaches the desired value.

13. A method as defined in claim 12, wherein determining the estimate of the deviation comprises determining an estimate of a difference between the property of the batch process at the particular time and a property of a model batch process at a time during the model batch process that corresponds to the particular time.

14. A method as defined in claim 13, wherein determining the estimate of the deviation further comprises dividing the estimate of the difference between the property of the batch process and the property of a model batch process by an estimate of a rate of reaction of the model batch process.

15. A method as defined in claim 14, wherein the estimate of the rate of reaction of the model batch process is an estimate of a rate of reaction of the model batch process proximate to the end of the model batch process.

16. A method as defined in claim 14, wherein the estimate of the rate of reaction of the model batch process is an estimate of a rate of reaction of the model batch process at a time during the model batch process that corresponds to the particular time.

17. A method as defined in claim 12, further comprising determining an estimate of time remaining until the property of the batch process reaches a desired value based on the estimate of the deviation.

18. A method as defined in claim 17, wherein determining the estimate of time remaining comprises subtracting the estimate of the deviation and an elapsed time from the expected time.

19. A method as defined in claim 1, further comprising multiplying the rate of reaction estimates with a gain adjustment.

20. A method as defined in claim 1, further comprising adding an offset adjustment to the rate of reaction estimates.

21. A method as defined in claim 20, further comprising multiplying the rate of reaction estimates with a gain adjustment.

22. A method for training a non-parametric model for estimating a rate of reaction of a batch process, the method comprising:

initializing the non-parametric model;

generating a plurality of rate of reaction estimates with the non-parametric model using a training record corresponding to a batch process;

generating an estimate of an ending property of the batch process based on the plurality of rate of reaction estimates;

comparing the estimate of the ending property with a measured ending property of the batch process to generate an error; and adjusting the non-parametric model based on the error.

23. A method as defined in claim 22, wherein the non-parametric model comprises a neural network having a plurality of weights;

wherein initializing the non-parametric model comprises initialzing the plurality of weights; and wherein adjusting the non-parametric model comprises adjusting the plurality of weights.

24. A method as defined in claim 22, wherein generating the estimate of the ending property of the batch process comprises integrating the plurality of rate of reaction estimates.

25. A method as defined in claim 22, further comprising determining a gain adjustment value based on a plurality of estimates of the ending property corresponding to a plurality of batch processes and a plurality of measurements of the ending property corresponding to the plurality of batch processes, wherein the plurality of estimates of the ending property are generated by the non-parametric model.

26. A method as defined in claim 22, further comprising:

determining a plurality of errors based on a plurality of estimates of the ending property corresponding to a plurality of batch processes and a plurality of measurements of the ending property corresponding to the plurality of batch processes, wherein the plurality of estimates of the ending property are generated by the non-parametric model; and determining an offset adjustment value based on the plurality of errors.

27. A batch property estimator, comprising:

a non-parametric model configured to receive data associated with a batch process and to generate a plurality of rate of reaction estimates related to the batch process; and a first integrator, coupled the non-parametric model, to integrate the plurality of rate of reaction estimates to generate an estimate of a property of the batch process at a particular time.

28. A batch property estimator as defined in claim 27, further comprising a memory coupled to the first integrator to store to store an estimate of an ending property of the batch process.

29. A batch property estimator as defined in claim 27, further comprising a property difference estimate generator to generate an estimate of a difference of the property of the batch process at the particular time with a property of a model batch process at a time corresponding to the particular time.

30. A batch property estimator as defined in claim 29, wherein the property difference estimate generator comprises:

a model reaction rates store to generate rate of reaction estimates of a model batch process that correspond to the plurality of rate of reaction estimates;

a first adder coupled to the model reaction rate store and the non-parametric model to subtract the plurality of rate of reaction estimates from the rate of reaction estimates of the model batch process to generate a plurality of rate of reaction differences; and a second integrator coupled to the adder to integrate the plurality of rate of reaction differences to generate an estimate of the difference of the property of the batch process at the particular time with the property of the model batch process at the time corresponding to the particular time.

31. A batch properly estimator as defined in claim 29, wherein the property difference estimate generator comprises:

a model batch property store to generate a property of a model batch process that corresponds to the estimate of the property of the batch process at the particular time; and an adder coupled to the model batch property store and the first integrator to subtract the estimate of the property of the batch process at the particular time from the property of the model batch process.

32. A batch property estimator as defined in claim 29, further comprising a predicted ending property generator coupled to the property difference estimate generator to generate a prediction of the property of the batch process at an expected ending time based on the estimate of the difference of the property of the batch process at the particular time with the property of the model batch process at the time corresponding to the particular time.

33. A batch property estimator as defined in claim 32, wherein the predicted ending property generator comprises an adder to add the estimate of the difference of the property with a desired property of the batch process at the ending time.

34. A batch property estimator as defined in claim 29, further comprising a time deviation generator coupled to the property difference estimate generator to generate an estimate of a deviation between an actual time at which the property of the batch process reaches a desired value and an expected time at which the property of the batch process reaches the desired value based on the estimate of the difference of the property of the batch process at the particular time with the property of the model batch process at the time corresponding to the particular time.

35. A batch property estimator as defined in claim 34, wherein the time deviation generator comprises:

a model reaction rate store to generate a rate of reaction estimate of a model batch process; and a divider coupled to the model reaction rate store and to the property difference estimate generator, to divide the model reaction rate store and to the property by the rate of reaction estimate of a model batch process to generate the estimate of the deviation.

36. A batch property estimator as defined in claim 35, wherein the rate of reaction estimate of the model batch process comprises an estimate of a rate of reaction of the model batch process at time corresponding to the particular time.

37. A batch property estimator as defined in claim 35, wherein the rate of reaction estimate of the model batch process comprises an estimate of a rate of reaction of the model batch process proximate to an end of the model batch process.

38. A batch property estimator as defined in claim 34, further comprising a time remaining estimate generator coupled to the time deviation generator to generate an estimate of time remaining until the property of the batch process reaches the desired value based on the estimate of the deviation.

39. A batch property estimator as defined in claim 38, wherein the time remaining estimate generator comprises an adder to subtract the estimate of the deviation and an elapsed time of the batch process from an expected ending time.

40. A batch property estimator as defined in claim 27, wherein the non-parametric model comprises a neural network.

41. A method for facilitating control of a batch process, the method comprising:

determining rate of reaction estimates associated with the batch process using a non-parametric model;

determining estimate data related to the batch process based on the rate of reaction estimates, the estimate data related to the batch process including at least one of an estimate of a property of the batch process at a particular time and an estimate of a difference between the property at the particular time and a property of a model batch process at a time during the model batch process that corresponds to the particular time; and using the estimate data to facilitate control of the batch process.

42. A method as defined in claim 41, wherein using the estimate data comprises determining additional estimate data based on the estimate data.

43. A method as defined in claim 42, wherein the additional estimate data comprises a predicted property at an ending time.

44. A method as defined in claim 42, wherein the additional estimate data comprises an estimate of a deviation between an actual time at which the property reaches a desired value and an expected time at which the batch process reaches the desired value.

45. A method as defined in claim 42, wherein the additional estimate data comprises data associated with an estimate of a time at which the property reaches a desired value.

46. A method as defined in claim 42, wherein the additional estimate data comprises an estimate of time remaining until the property reaches a desired value.

47. A method as defined in claim 42, further comprising using the additional estimate data to facilitate control or the batch process.

48. A method as defined in claim 47, wherein using the additional estimate data comprises displaying at least some of the additional estimate data on a display device.

49. A method as defined in claim 47, wherein using the additional estimate data comprises providing at least some of the estimate data to a controller associated with control of the batch process.

50. A method as defined in claim 49, wherein using the estimate data further comprises using at least some of the estimate data to control the batch process via the controller.

51. A method as defined in claim 41, wherein using the estimate data comprises displaying at least some of the estimate data on a display device.

52. A method as defined in claim 41, wherein using the estimate data comprises providing at least some of the estimate data to a controller associated with control of the batch process.

53. A method as defined in claim 52, wherein using the estimate data further comprises using at least some of the estimate data to control the batch process via the controller.

* * * * *

UNITED STATES PATENT AND TRADEMARK OFFICE

CERTIFICATE OF CORRECTION

PATENT NO. : 7,242,989 B2
APPLICATION NO. : 10/449437
DATED : July 10, 2007
INVENTOR(S) : Terrence L. Blevins et al.

It is certified that error appears in the above-identified patent and that said Letters Patent is hereby corrected as shown below:

On the Title Page:

At field (75), 2nd named Inventor, "Austin" should be -- Round Rock --.

In the Claims:

At Column 20, line 25, "control or" should be -- control of --.

Signed and Sealed this

Thirteenth Day of May, 2008

JON W. DUDAS
*Director of the United States Patent and Trademark Office*